Nov. 18, 1958 J. F. WILCOX 2,860,797
MATERIAL HANDLING DEVICE
Filed Jan. 12, 1956 3 Sheets-Sheet 1

INVENTOR.
John F. Wilcox
BY
M. K. Murphy
ATTORNEY.

Nov. 18, 1958 J. F. WILCOX 2,860,797
MATERIAL HANDLING DEVICE
Filed Jan. 12, 1956 3 Sheets-Sheet 2
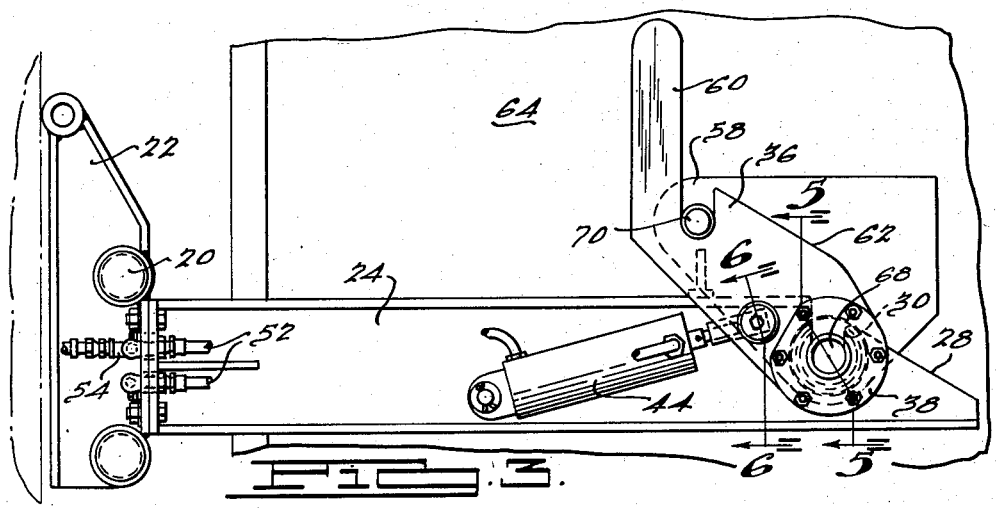
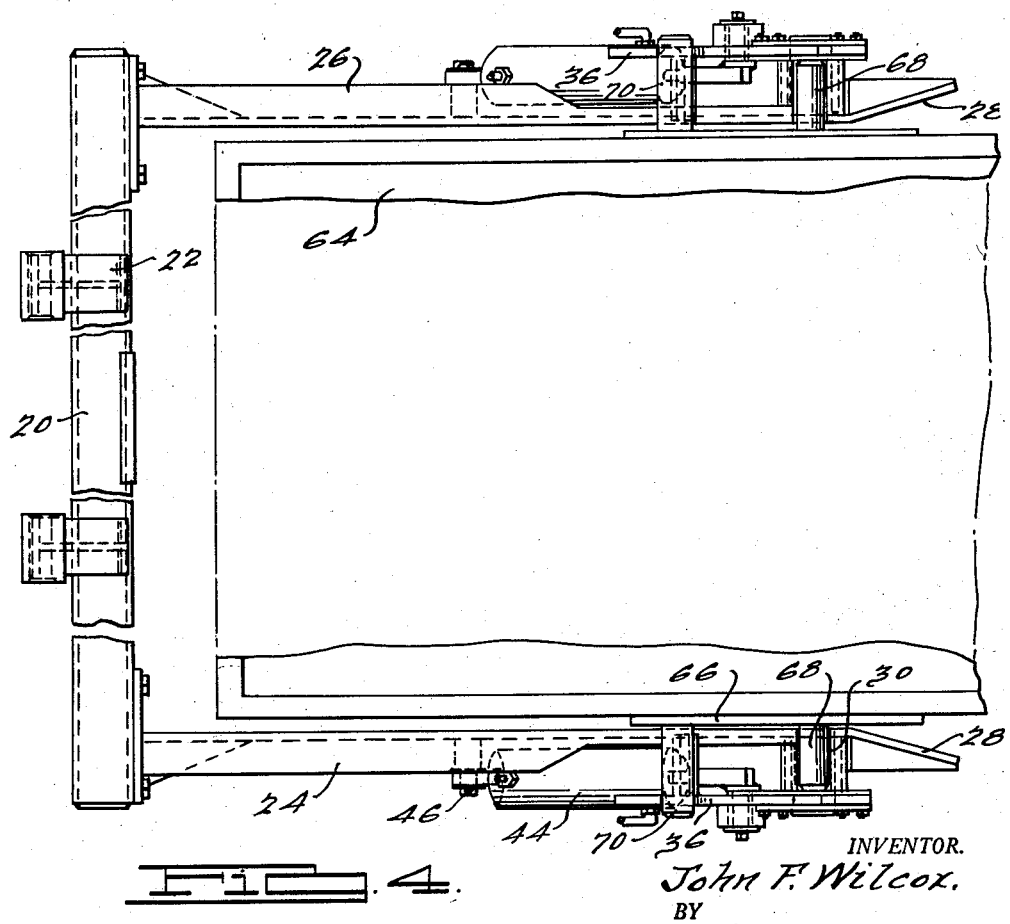
INVENTOR.
John F. Wilcox.
BY
ATTORNEY.

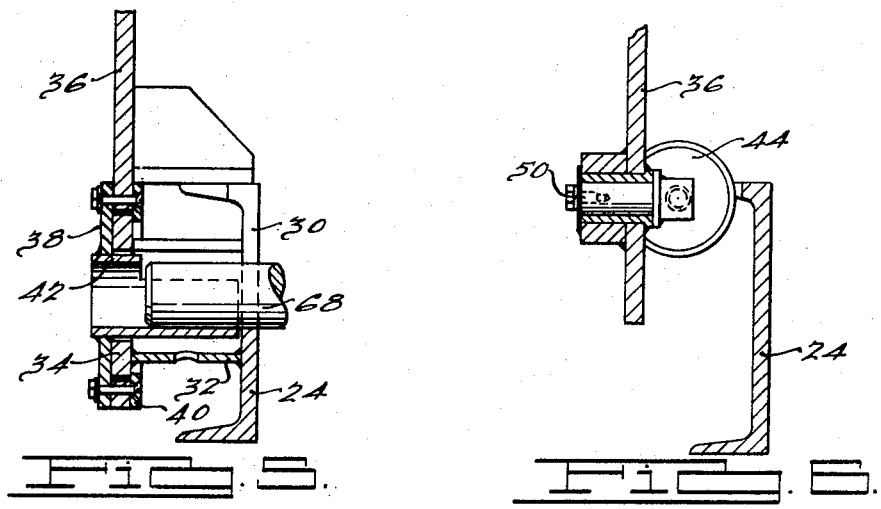
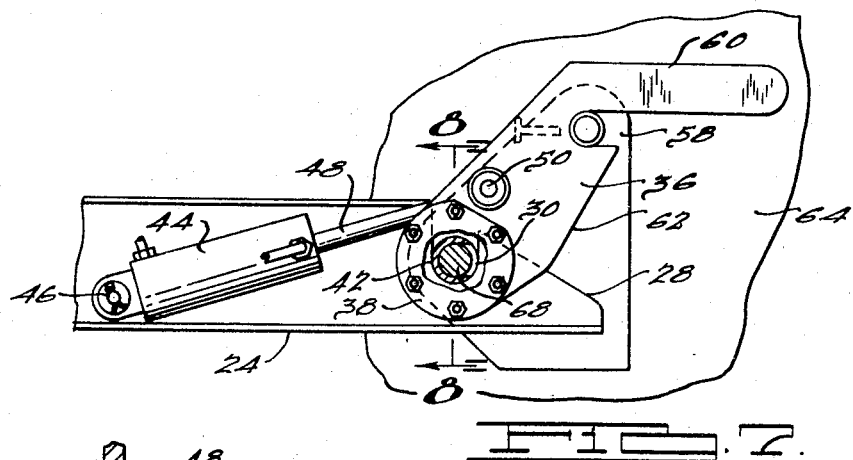
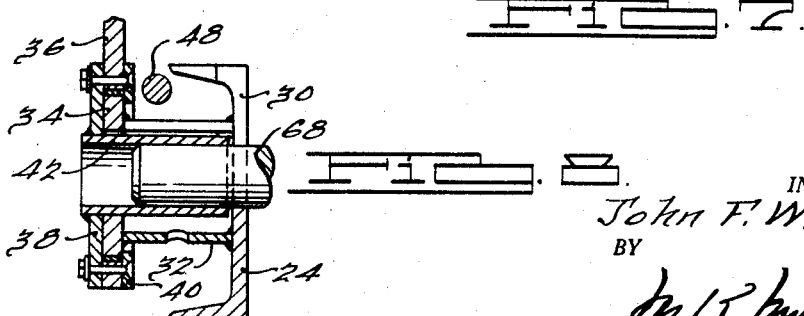

United States Patent Office 2,860,797
Patented Nov. 18, 1958

2,860,797

MATERIAL HANDLING DEVICE

John F. Wilcox, Royal Oak, Mich., assignor to Sherman Products, Inc., Royal Oak, Mich., a corporation of Michigan Application January 12, 1956, Serial No. 558,641

2 Claims. (Cl. 214—313)

This invention relates to material handling equipment, and particularly to power operated handling devices adapted for attachment to tractors or lift trucks and used in connection with special containers.

Problems encountered in the handling of bulk material and small parts in factories, and in the gathering of fruits and vegetables and in transporting same, has fostered development of specially designed containers adapted to be handled by automotive vehicles. These containers are sometimes referred to as "tote-boxes."

It is the principal object of my invention to provide a simple and economically constructed power operated attachment for a tractor or lift truck whereby a tote-box may be picked up from the ground or a platform, raised, transported, dumped and returned to the ground or platform by the vehicle operator without his leaving the vehicle seat.

A further object is to provide novel engaging and locking means for picking up the container and dumping it after raising it to desired height, such as, for example, into a bin, railroad car or dump truck.

Another object is to provide a simple and easily secured attachment for the container or box by means of which the lifting and dumping means of the vehicle is enabled to handle the box.

Other objects and advantages of my invention will be apparent from the following description which, taken in conjunction with the accompanying drawings, discloses a preferred form of the device.

In the drawings:

Fig. 3 is a partial side elevation, on an enlarged scale, of the attachment just after it has engaged the box;

Fig. 4 is a plan view of the parts shown in Fig. 3;

Fig. 5 is a section taken on the line 5—5 of Fig. 3;

Fig. 6 is a section taken on the line 6—6 of Fig. 3;

Fig. 7 is a side elevation of the operating parts of the attachment in dumping position; and Fig. 8 is a section taken on the line 8—8 of Fig. 7.

Figure 1:
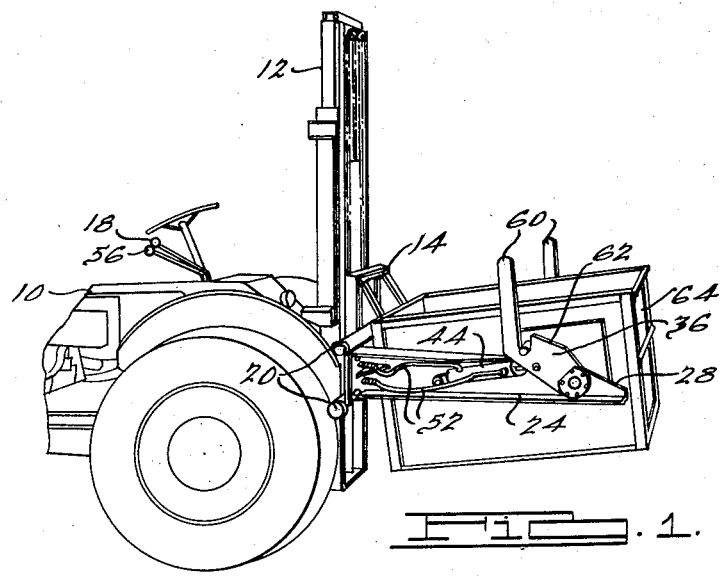
Fig. 1 is a side elevation of the front end of a tractor having my lifting and dumping attachment mounted thereon and showing a tote-box in partially elevated or transport position.
Figure 2:
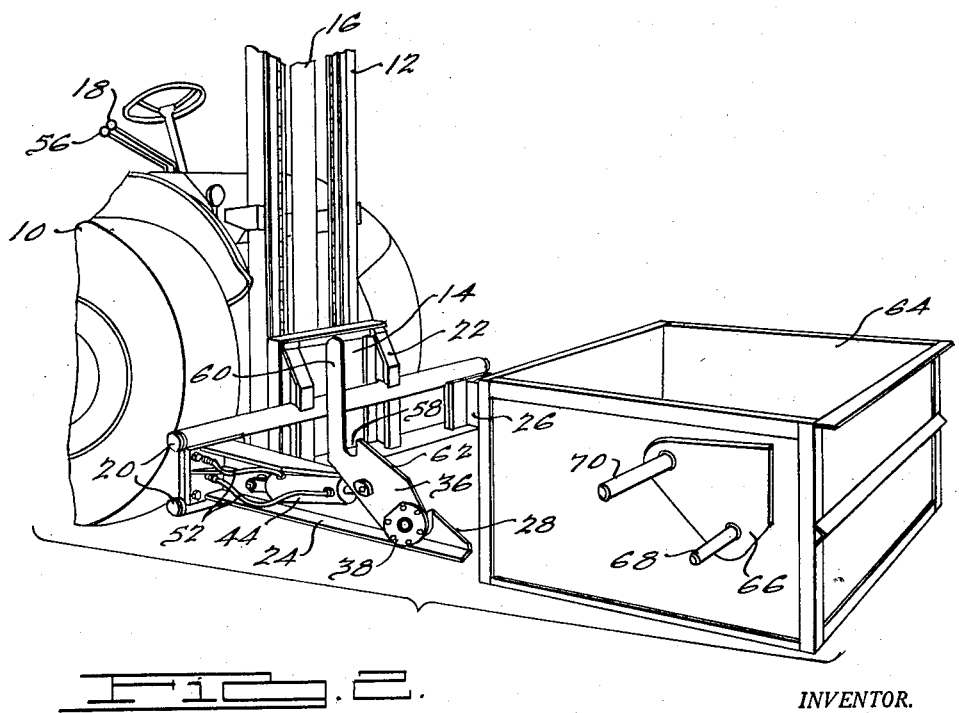
Fig. 2 shows the tractor and box as they appear when the box is about to be picked up or just after it has been deposited on the ground or floor.

Figs. 3 to 8 inclusive are on an enlarged scale relative to Figs. 1 and 2.

Referring now to the figures, it will be seen that I have shown my attachment mounted on a tractor 10 of the lift truck type having a lifting device 12 mounted thereon. The lifting device includes a pair of uprights having tracks for slidably supporting an elevator block 14, a hydraulic cylinder 16 for actuating the elevator block and the necessary chains, pulleys and other apparatus required for operating the block 14. Inasmuch as the details of the elevating device itself form no essential portion of the invention and such devices are well known in the art, a description thereof will be omitted, it being deemed sufficient to state that the block 14 is adapted to be moved up and down the uprights by hydraulic power furnished by the tractor's power system under control of the tractor operator by means of the control lever 18.

Carried by the elevator block 14 is a transverse frame, which together with the block constitutes the elevating mechanism of the vehicle. This transverse frame comprises a pair of structural members, preferably tubing, 20, welded or otherwise secured to vertical members 22 of the block 14. The frame has a pair of longitudinally extending frame members 24, 26, mounted thereon at each end. These frame members or arms extend forwardly in cantilever fashion and are fabricated from channel section for maximum rigidity.

Near the forward end, each of said cantilever members is tapered to provide a ramp portion 28, and these portions are bent divergently, as shown in Fig. 4, for a purpose to be explained below. Just rearwardly of the ramps 28, the arms 24, 26, are formed with a semi-circular cut-out 30. Welded to the outer side of each arm in alignment with the cut-outs 30 are semi-cylindrical members 32 (Figs. 5 and 8), the top halves thereof being open like the cut-outs; and welded to the outer ends of the members 32 are annular flange members 34.

A pair of dumping arms 36 are mounted on the flanges 34 by means of annular plates 38, 40. The arms 36 are bolted to the plates which are respectively disposed on each side of the flange 34 such that the dumping arms are swingable about the axis of the semi-cylindrical member 32. A pair of bushings 42 are welded to the outer plates 38 and extend inwardly toward the center of the frame. The bushings 42 have cut-outs along a substantial portion of their lengths as shown in Fig. 5.

Each arm 24, 26, carries a hydraulic cylinder 44. These cylinders are pivoted to the channel webs at 46 and each carries a piston rod pivotally connected to the dumping arms at 50. The cylinders are double acting and are supplied with pressure fluid by means of the tubes and fittings 52, 54, which are connected with the tractor's hydraulic system through flexible hoses (not shown), all of which is common in the art. The control knob 56 mounted near the driver's position is arranged to control operation of the cylinders 44.

The dumping arms 36 are formed with slots 58 and adjacent upward extensions 60 at their rear portions; and just forwardly of the slots, the arms are provided with ramped portions 62.

The container or tote-box 64, preferably used with the mechanism just described, may be of almost any desired material and construction and is provided at each side thereof with a plate 66. The plates carry trunnions 68 and 70 which extend outwardly and are disposed such that they are adapted to be engaged by the dumping mechanism in a manner about to be described.

The device operates as follows: Fig. 2 shows the tractor equipped with my improved material handling device in position to pick up a container 64. The container is shown empty but may be filled or partially filled with any bulk material to be transported.

When it is desired to pick up the box or container 64, the operator simply drives the tractor forwardly with the lift mechanism in proper position to engage the trunnions 68, 70. The arms 24, 26, embrace the box at the sides and as the tractor approaches the box, the trunnions 68, 70, engage and slide on the ramps 28 and 62 respectively until the trunnions 70 have fallen into the slots 58 and the trunnions 68 have fallen into the slots or cut-outs 30. The tractor elevating mechanism may now be manipulated to raise the box 64 to any desired height. Fig. 1 illustrates the box in a position suitable for transport by the tractor.

The box 64 may then be transported as desired and set down again. The lift device is disengaged from the box simply by resting the box on a suitable surface and lowering the lift arms 24, 26, until they disengage the trunnions 68, 70, whereupon the tractor may be backed away from the box.

If it is desired to dump the contents of the box into a railroad car, truck or other place, the box is elevated to desired height after being transported to the place of dumping and the control knob 56 is then actuated to cause the cylinders 44 to swing the arms 36 about the axis of the trunnions 68.

As the dumping arms 36 swing forwardly from the position shown in Figs. 1 and 3 to that of Fig. 7, which is the extreme dumping position, the bushings 42 are rotated such that the semi-cylindrical portions thereof engage the trunnions 68 thereby preventing displacement of the trunnions from the slots as would normally occur when the parts are moved to the Fig. 7 position. After dumping, the return of the dumping arms to transport position automatically unlocks the trunnions 68 and the box is ready for release.

It is thus apparent that the locking and unlocking function of the arms 36 is entirely automatic and is operable in response to dumping and return motion of the dumping arms without attention on the part of the vehicle operator. No complicated or costly mechanism is required and no separate locking means is necessary as is the case in similar devices heretofore known.

While I have shown for illustrative purposes only one specific modification of my invention, it will be obvious that various changes in size and arrangement of the various parts may be made without departing from the spirit of my invention, the scope of which is set forth in the appended claims.

I claim:

1. In a device for handling and dumping an open top container having transversely extending first and second trunnions projecting laterally from each side thereof, spaced lift arms adapted to extend along opposite sides of said container to underline the first trunnions, means for elevating said lift arms, said lift arms each having a semi-circular open-topped slot therein adapted to receive the first trunnions, a swingable dumping arm carried by each lift arm pivotable about the axis of the circular portion of the slot in the associated lift arm, each dumping arm having an open-topped slot therein in the inactive position of the dumping arm adapted to receive the second trunnions, means for swinging said dumping arms with respect to the lift arms from said inactive position, a cylindrical shaped bushing carried by each dumping arm with the axis thereof aligned with the axis of the circular portion of the slot in the associated lift arm, said bushings each having an upward facing open area registering with the open top of the slot in the lift arm to receive free ends of the first trunnions when the dumping arms are in an inactive position, and each bushing being connected to the associated dumping arm so that cylindrical portions of the bushings in turn about the free ends of the first trunnions during swinging movement of the dumping arms to retain the first trunnions within the open-topped slots in the lift arms.

2. In a device for handling and dumping an open top container having transversely extending first and second trunnions projecting laterally from each side thereof according to claim 1 wherein a ramp surface is provided on an upper portion of the forward end of each lift arm which slope upwardly in proceeding rearwardly to the open-topped slots therein.

References Cited in the file of this patent

UNITED STATES PATENTS

| | | |
|---|---|---|
| 2,413,661 | Stokes | Dec. 31, 1946 |
| 2,744,642 | Sewell et al. | May 8, 1956 |